(12) United States Patent
Kim et al.

(10) Patent No.: US 11,378,108 B2
(45) Date of Patent: Jul. 5, 2022

(54) METHOD AND APPARATUS FOR DIAGNOSING PNEUMATIC CONTROL VALVE BY USING POSITIONER MODEL

(71) Applicant: KOREA HYDRO & NUCLEAR POWER CO., LTD, Gyeongsangbuk-do (KR)

(72) Inventors: Yang Seok Kim, Daejeon (KR); Dae Woong Kim, Sejong (KR); Bum Nyun Kim, Gyeongsangbuk-do (KR); Young Sheop Park, Sejong (KR); Chi Yong Park, Daejeon (KR); Jong Seog Kim, Daejeon (KR); Hyoung Kyun Kim, Daejeon (KR); Byoung Oh Lee, Daejeon (KR); Ji In Kim, Seoul (KR); Nam Woo Choi, Gyeonggi-do (KR); Yong Hoon Park, Gyeongsangbuk-do (KR); Hee Seung Chang, Daejeon (KR); You Soo Shin, Gyeongsangbuk-do (KR)

(73) Assignee: KOREA HYDRO & NUCLEAR POWER CO., LTD, Gyeongsangbuk-do (KR)

( * ) Notice: Subject to any disclaimer, the term of this patent is extended or adjusted under 35 U.S.C. 154(b) by 725 days.

(21) Appl. No.: 16/329,345

(22) PCT Filed: Aug. 30, 2017

(86) PCT No.: PCT/KR2017/009477
§ 371 (c)(1),
(2) Date: Feb. 28, 2019

(87) PCT Pub. No.: WO2018/044062
PCT Pub. Date: Mar. 8, 2018

(65) Prior Publication Data
US 2019/0195249 A1 Jun. 27, 2019

(30) Foreign Application Priority Data

Aug. 30, 2016 (KR) .................. 10-2016-0110620

(51) Int. Cl.
*F15B 19/00* (2006.01)
*F16K 31/12* (2006.01)
*F16K 37/00* (2006.01)

(52) U.S. Cl.
CPC ............ *F15B 19/005* (2013.01); *F15B 19/00* (2013.01); *F16K 31/12* (2013.01); *F16K 37/00* (2013.01);
(Continued)

(58) Field of Classification Search
CPC .. F15B 19/005; F15B 19/00; F15B 2211/857; F15B 2211/87; F16K 31/12; F16K 37/00;
(Continued)

(56) References Cited

U.S. PATENT DOCUMENTS 5,758,686 A * 6/1998 Ohtsuka .................. G05D 7/005
137/488
6,466,893 B1 10/2002 Latwesen et al.
(Continued)

FOREIGN PATENT DOCUMENTS

| CN | 101245871 | 8/2008 |
|----|-----------|--------|
| JP | 2001075651 | 3/2001 |

(Continued)

OTHER PUBLICATIONS

European Search Report dated Apr. 3, 2020 in EP Application No. 17846987.0.

*Primary Examiner* — Alexander Satanovsky
(74) *Attorney, Agent, or Firm* — Occhiuti & Rohlicek LLP

(57) ABSTRACT

Method for diagnosing a pneumatic control valve by using a positioner model includes: establishing relational expres-
(Continued)

sion for outputting valve stem displacement according to control pressure, the relational expression including parameters for the characteristics of a positioner, an actuator, and a valve, determining initial parameter value by adjusting the values of the parameters until the difference between a measured value for a normal operation of the pneumatic control valve and output value obtained by the relational expression is smaller than predetermined error limit, determining diagnostic parameter value by adjusting the values of the parameters until the difference between a measured value for a diagnostic operation of the pneumatic control valve and an output value obtained by the relational expression is smaller than a predetermined error limit, and comparing the initial parameter value and the diagnostic parameter value so as to determine whether the pneumatic control valve has abnormality.

14 Claims, 19 Drawing Sheets

(52) U.S. Cl.
CPC ...... *F16K 37/0041* (2013.01); *F16K 37/0083* (2013.01)

(58) Field of Classification Search
CPC ............. F16K 37/0041; F16K 37/0083; G05B 2219/33326; G05B 2219/45006; G05B 23/0243; G05B 23/0254
See application file for complete search history.

(56) References Cited

U.S. PATENT DOCUMENTS

| | | |
|---|---|---|
| 2004/0228173 A1 | 11/2004 | Schoonover |
| 2008/0177513 A1 | 7/2008 | Miller |
| 2009/0222220 A1 | 9/2009 | Wilke |
| 2016/0071004 A1 | 3/2016 | Salahshoor et al. |

FOREIGN PATENT DOCUMENTS

| | | |
|---|---|---|
| JP | 3656892 | 6/2005 |
| JP | 2005282718 | 10/2005 |
| KR | 1019970044748 | 7/1997 |
| KR | 20130009396 | 1/2013 |
| KR | 101470455 | 12/2014 |

\* cited by examiner

[Pilot valve port]

| Position | Meaning | Comparison |
|---|---|---|
| A | First output pressure port | Lower part of actuator |
| B | Second output pressure port | Upper part of actuator |
| C | Vent port 1 | - |
| D | Supply pressure port | Input |
| E | Vent port 2 | - |

(a) Positioner (b) Actuator and valve (a) Control valve model block diagram (b) Model parameter position (a) Initial assumption parameter is applied (b) Optimized parameter is applied

METHOD AND APPARATUS FOR DIAGNOSING PNEUMATIC CONTROL VALVE BY USING POSITIONER MODEL

CROSS REFERENCE TO RELATED APPLICATIONS

This application is a National Phase under 35 U.S.C. 371 of International Application No. PCT/KR2017/009477 filed on Aug. 30, 2017, which claims priority to Korean Application No. 10-2016-0110620 filed on Aug. 30, 2016.

TECHNICAL FIELD

The present invention relates to a pneumatic control valve and, more particularly, to a method and apparatus for diagnosing a pneumatic control valve.

BACKGROUND ART

A pneumatic control valve may be used in a power generation device, and the like. Such a pneumatic control valve is a device that performs very important role in power plant operation such as rate of flow adjustment, tank level adjustment, and the like in a power plant, and needs to be driven without failure in normal driving of the power plant. Accordingly, in order to maintain a valve state of the pneumatic control valve in optimal condition, regular maintenance is required and an important component should be replaced for a predetermined period. In addition, when an abnormal state occurs during operation, the power plant is stopped and the state is checked by using a valve diagnosing equipment. Accordingly, it is important to diagnose the pneumatic control valve such that the pneumatic control valve may maintain a proper state, and to prevent an abnormal state.

PRIOR ART DOCUMENT

[Patent Document]
(Patent document 1) U.S. Pat. No. 6,466,893 (Statistical determination of estimates of process control loop parameters)

DISCLOSURE

Technical Problem

An object of the present invention to solve the problem described above is to provide a method for diagnosing a pneumatic control valve by using a positioner model. According to the method, a relational expression is established for a positioner, an actuator and a valve included in the pneumatic control valve. Parameters are determined, which indicate a state of the pneumatic control valve from the relational expression. Changes of the parameters are evaluated in real time when the pneumatic control valve operates, and compared with parameter values (reference values) in a normal state, and accordingly, a state of the pneumatic control valve can be diagnosed.

Another object of the present invention to solve the problem described above is to provide an apparatus for diagnosing a pneumatic control valve by using a positioner model. According to the apparatus, a relational expression is established for a positioner, an actuator and a valve included in the pneumatic control valve. Parameters are determined, which indicate a state of the pneumatic control valve from the relational expression. Changes of the parameters are evaluated in real time when the pneumatic control valve operates, and compared with parameter values (reference values) in a normal state, and accordingly, a state of the pneumatic control valve can be diagnosed.

The technical problems to solve in the present invention are not limited thereto, but may be extended in various manners within the scope not departing from the concept and scope of the present invention.

Technical Solution

A method for diagnosing a pneumatic control valve by using a positioner model according to an example embodiment of the present invention to attain the technical object relates to a method for diagnosing a pneumatic control valve including a controller for outputting a control pressure, a positioner for receiving the control pressure as an input and controlling a pressure supplied to an actuator, the actuator for driving a valve based on the supplied pressure and the valve, the method may include establishing a relational expression for outputting a valve stem displacement according to the control pressure, the relational expression including parameters for properties of the positioner, the actuator and the valve; determining an initial parameter value by adjusting the values of the parameters until a difference between a measurement value for a normal operation of the pneumatic control valve and an output value obtained by the relational expression is smaller than a predetermined error limit; determining a diagnostic parameter value by adjusting the values of the parameters until the difference between a measured value for a diagnostic operation of the pneumatic control valve and an output value obtained by the relational expression is smaller than a predetermined error limit; and determining whether the pneumatic control valve has an abnormality by comparing the initial parameter value and the diagnostic parameter value.

According to an aspect, the parameters may include a model parameter, an internal parameter and an estimated internal parameter, the output value obtained by the relational expression may change according to a change of the model parameter value, the internal parameter may be a fixed value according to a specification of the pneumatic control valve, and the estimated internal parameter may be a fixed value by estimating initially for the pneumatic control valve by one time.

According to an aspect, the step of determining an initial parameter value may determine the initial parameter value and an initial estimated internal parameter based on a predetermined internal parameter value, the step of determining a diagnostic parameter value may determine the diagnostic parameter value based on the predetermined internal parameter value and the initial estimated internal parameter value, and the step of determining whether the pneumatic control valve has an abnormality may determine whether the pneumatic control valve has an abnormality by comparing the initial model parameter and the diagnostic model parameter.

According to an aspect, the model parameter may include a preload of a spring included in the positioner and a stem displacement transmissibility of a stem displacement feedback connection part included in the positioner.

According to an aspect, the internal parameter may include a cross sectional area of a diaphragm included in the positioner and a cross sectional area of a piston included in the actuator.

According to an aspect, the estimated internal parameter may include a pressure amplification factor of a pilot valve included in the positioner and a bulk modulus of elasticity of air within a piston included in the actuator.

According to an aspect, the relational expression may have a following transfer function:

$$x_s = \frac{1}{1 - H_1 G_1} * (\text{input1} * H_1) + \frac{1}{1 + H_2 G_2} * (\text{input2} * H_2)$$

input1: Input signal, $P_c * A_c - F_{popre}$
$H_1$: Forward Gain 1, $V_p * P_s * A_{act} * (1/k_{air})$
$G_1$: Backward Gain 1, $G_{fb}$
input2: input signal, $F_{stem}$
$H_2$: Forward Gain 2, $1/k_{air}$
$G_2$: Backward Gain 2, $A_{act} * V_p * P_s * -G_{fb}$ Herein, $x_s$ represents a stem displacement of the valve, $P_c$ represents a control pressure, $A_c$ represents a diaphragm cross sectional area of the positioner, $F_{popre}$ represents an internal spring preload of the positioner, $V_p$ represents a pressure amplification factor of a pilot valve of the positioner, $P_s$ represents a supply pressure of a pilot valve of the positioner, $A_{act}$ represents a cross sectional area of a piston of the actuator, $k_{air}$ represents a bulk modulus of elasticity of air within a piston, $G_{fb}$ represents a stem displacement transmissibility and $F_{stem}$ represents a load generated in the actuator or the valve.

An apparatus for diagnosing a pneumatic control valve by using a positioner model according to another example embodiment of the present invention to attain the technical object relates to an apparatus for diagnosing a pneumatic control valve including a controller for outputting a control pressure, a positioner for receiving the control pressure as an input and controlling a pressure supplied to an actuator, the actuator for driving a valve based on the supplied pressure and the valve, the apparatus may include a model generation unit for establishing a relational expression for outputting a valve stem displacement (or a stem displacement of valve) according to the control pressure, the relational expression including parameters for properties of the positioner, the actuator and the valve; an initial value determination unit for determining an initial parameter value by adjusting the values of the parameters until a difference between a measurement value for a normal operation of the pneumatic control valve and an output value obtained by the relational expression is smaller than a predetermined error limit; a diagnostic value determination unit for determining a diagnostic parameter value by adjusting the values of the parameters until the difference between a measured value for a diagnostic operation of the pneumatic control valve and an output value obtained by the relational expression is smaller than a predetermined error limit; and a diagnostic unit for determining whether the pneumatic control valve has an abnormality by comparing the initial parameter value and the diagnostic parameter value.

According to an aspect, the parameters may include a model parameter, an internal parameter and an estimated internal parameter, the output value obtained by the relational expression may change according to a change of the model parameter value, the internal parameter may be a fixed value according to a specification of the pneumatic control valve, and the estimated internal parameter may be a fixed value by estimating initially for the pneumatic control valve by one time.

According to an aspect, the initial value determination unit may determine the initial parameter value and an initial estimated internal parameter based on a predetermined internal parameter value, the diagnostic value determination unit may determine the diagnostic parameter value based on the predetermined internal parameter value and the initial estimated internal parameter value, and the diagnostic unit may determine whether the pneumatic control valve has an abnormality by comparing the initial model parameter and the diagnostic model parameter.

According to an aspect, the relational expression may have a following transfer function:

$$x_s = \frac{1}{1 - H_1 G_1} * (\text{input1} * H_1) + \frac{1}{1 + H_2 G_2} * (\text{input2} * H_2)$$

input1: Input signal, $P_c * A_c - F_{popre}$
$H_1$: Forward Gain 1, $V_p * P_s * A_{act} * (1/k_{air})$
$G_1$: Backward Gain 1, $G_{fb}$
input2: input signal, $F_{stem}$
$H_2$: Forward Gain 2, $1/k_{air}$
$G_2$: Backward Gain 2, $A_{act} * V_p * P_s * -G_{fb}$ Herein, $x_s$ represents a stem displacement of the valve, $P_c$ represents a control pressure, $A_c$ represents a diaphragm cross sectional area of the positioner, $F_{popre}$ represents an internal spring preload of the positioner, $V_p$ represents a pressure amplification factor of a pilot valve of the positioner, $P_s$ represents a supply pressure of a pilot valve of the positioner, $A_{act}$ represents a cross sectional area of a piston of the actuator, $k_{air}$ represents a bulk modulus of elasticity of air within a piston, $G_{fb}$ represents a stem displacement transmissibility and $F_{stem}$ represents a load generated in the actuator or the valve.

A storage medium readable by a computer for diagnosing a pneumatic control valve by using a positioner model according to another example embodiment of the present invention to attain the technical object relates to a storage medium readable by a computer for diagnosing a pneumatic control valve including a controller for outputting a control pressure, a positioner for receiving the control pressure as an input and controlling a pressure supplied to an actuator, the actuator for driving a valve based on the supplied pressure and the valve, the storage medium may include a processor included in the computer to perform: a command for establishing a relational expression for outputting a valve stem displacement (or stem displacement of valve) according to the control pressure, the relational expression including parameters for properties of the positioner, the actuator and the valve; a command for determining an initial parameter value by adjusting the values of the parameters until a difference between a measurement value for a normal operation of the pneumatic control valve and an output value obtained by the relational expression is smaller than a predetermined error limit; a command for determining a diagnostic parameter value by adjusting the values of the parameters until the difference between a measured value for a diagnostic operation of the pneumatic control valve and an output value obtained by the relational expression is smaller than a predetermined error limit; and a command for determining whether the pneumatic control valve has an abnormality by comparing the initial parameter value and the diagnostic parameter value.

Advantageous Effects

The disclosed technique may have the following effect. However, this does not mean that a particular embodiment should include all of the following effects or only the following effects, and it is understood that the scope of the disclosed technique is not limited thereto.

According to the method and apparatus for diagnosing a pneumatic control valve by using a positioner model, a relational expression is established for a positioner, an actuator and a valve. Parameters are determined, which indicate a state of the pneumatic control valve from the relational expression. Changes of the parameters are evaluated in real time when the pneumatic control valve operates, and compared with parameter values (reference values) in a normal state, and accordingly, a state of the pneumatic control valve can be diagnosed.

Therefore, even before an abnormal state of the pneumatic control valve occurs, a state change of at least one of the positioner, the actuator and the valve included in the pneumatic control valve may be checked in advance, and it may be prevented a shutdown of a power plant device operation owing to an abnormal state of the pneumatic control valve, and accordingly, operation efficiency can be improved.

MODE FOR INVENTION

Figure 1:
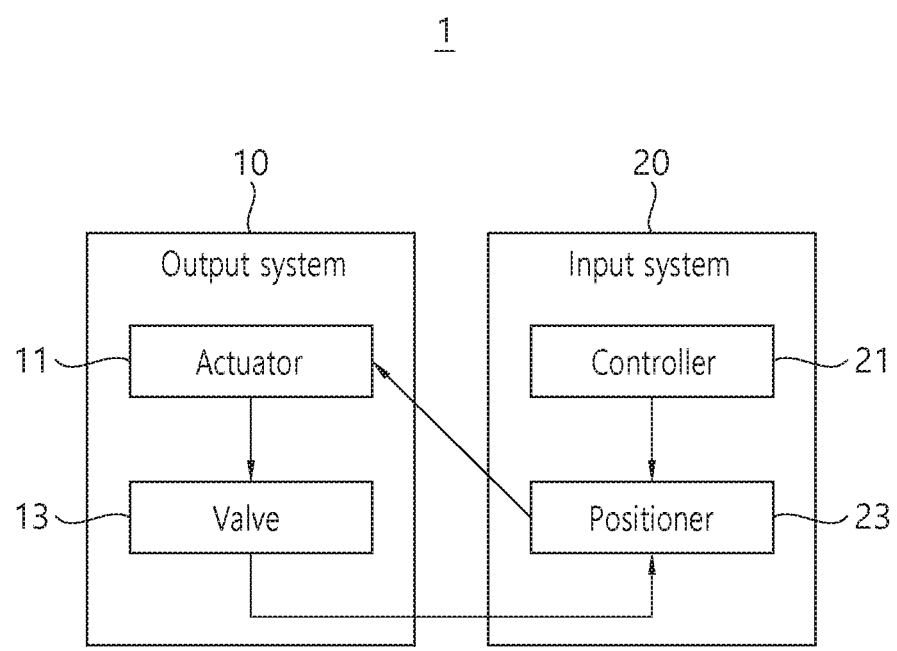
FIG. 1 is a block diagram illustrating a configuration of a pneumatic control valve.

The present invention may have various modifications and various embodiments and specific embodiments will be illustrated in the drawings and described in detail in the detailed description.

However, this does not limit the present invention to specific embodiments, and it should be understood that the present invention covers all the modifications, equivalents and replacements included within the idea and technical scope of the present invention.

Terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

When it is described that a component is "connected to" or "accesses" another component, the component may be directly connected to or access the other component or a third component may be present there between. In contrast, it should be understood that, when it is described that an element is "directly connected to" or "directly access" another element, it is understood that no element is present between the element and another element.

Terms used in the present application are used only to describe specific embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Unless it is contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present invention will be described in detail with reference to the accompanying drawings and in describing the preferred embodiments with reference to the accompanying drawings, the same reference numeral will refer to the same or corresponding component regardless of the reference numeral and a duplicated description thereof will be omitted.

The example embodiment of the present invention relates to a method for establishing a relational expression for a positioner, an actuator and a valve included in a pneumatic control valve and for diagnosing by using the relational expression. According to the method, parameters are determined, which indicate a state of the pneumatic control valve from the relational expression, changes of the parameters are evaluated in real time when the pneumatic control valve operates, and compared with parameter values (reference values) in a normal state, and accordingly, a state of the pneumatic control valve can be diagnosed.

Figure 2:
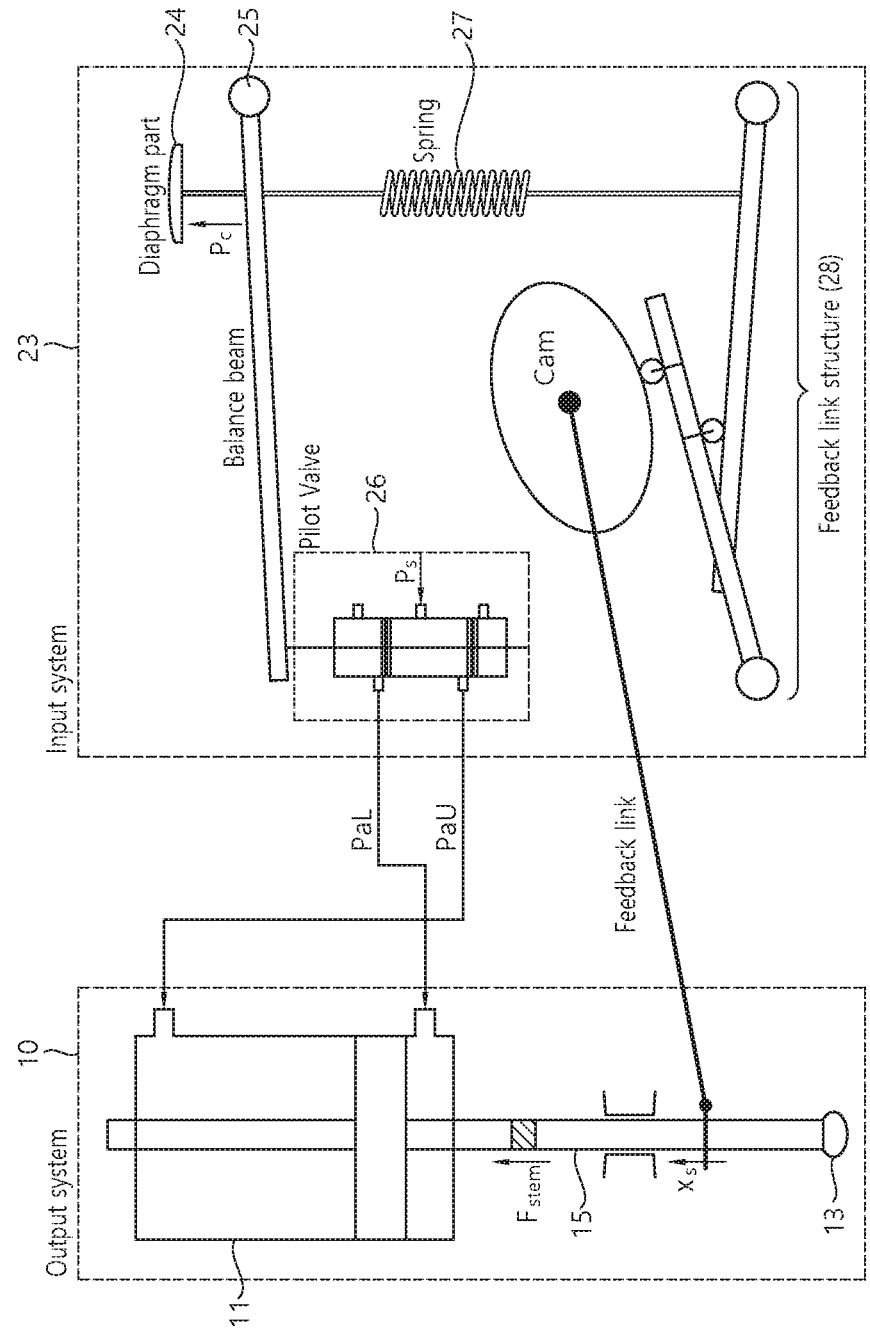
FIG. 2 is a detailed block diagram illustrating an input/output configuration of the pneumatic control valve shown in FIG. 1.

FIG. 1 is a block diagram illustrating a configuration of a pneumatic control valve, and FIG. 2 is a detailed block diagram illustrating an input/output configuration of the pneumatic control valve shown in FIG. 1. As shown in FIG. 1 and FIG. 2, a pneumatic control valve 1 includes an input system (control loop) 20 and an output system (valve-air actuator) 10, generally, and may be simplified as shown in FIG. 1. Main devices included in the input system 20 includes an I/P converter (hereinafter, may be referred to as a 'controller') 21 and a positioner 23. The position 23 receives a pressure output from the controller 21 as an input signal and outputs a pressure supplied to an actuator 11, and receives feedback of a displacement of a valve 13 and controls such that a valve displacement moves to a desired position. The output system 10 is configured with a form in which the actuator 11 and the valve 13 are coupled. In the example shown in FIG. 2, a piston type actuator 11 without a spring therein is used, and as a control pressure is applied, the actuator 11 and the valve 13 of the output system 10 operate.

For understanding operation principle of the input/output system, an understanding for the positioner 23 is required, which operate depending on a control pressure. Generally, for controlling the valve 13, a valve stem 15 needs to operate depending on the control pressure output from the controller 21. However, owing to force unbalance and the like occurred by a shape of the actuator 11, a pressure of fluid and a friction between a stem and a packing, there is a case that the valve stem 15 will not move as desired by a control signal. In this case, the positioner 23 is required. Particularly, the positioner 23 needs to be used in the case that the actuator is a piston type actuator without a spring therein or accurate operation is required for a small control signal change.

Main components of the positioner 23 are described with reference to right side of FIG. 2 in which an internal structure the positioner 23 is depicted. A diaphragm part 24 is a part of playing the role of an actuator of the positioner 23 and a pressure (generally, 3 to 15 psi) output from the controller 21 is input thereto. The diaphragm part 24, a balance beam 25, an internal spring 27 and a stem of a pilot valve 26 are connected with each other, and move together according to a control pressure. In the example embodiment of the present invention, it is assumed that a motion of the balance beam 25 is identical to a motion of the pilot valve 26. In addition, except the controller 21 and the positioner 23, among the accessory included in an actual control valve system, components operating according to an independent operation signal without regard to a control signal of the system such as a solenoid valve, a direction change valve, and the like are not included in the relational expression of the example embodiment of the present invention.

Figure 3:
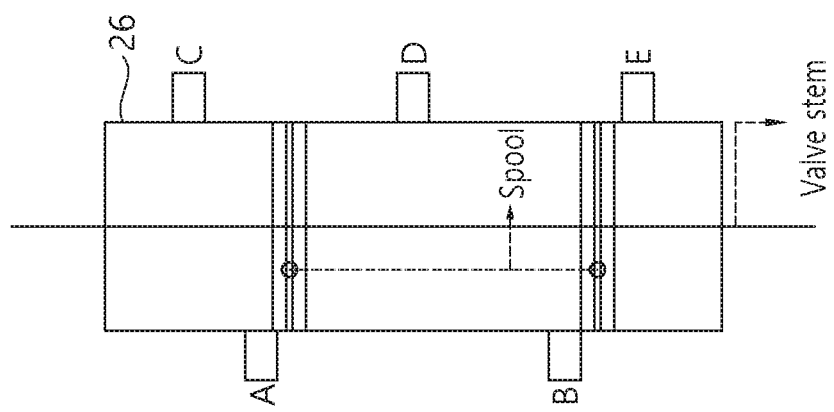
FIG. 3 shows a section of the pilot value shown in FIG. 2.

FIG. 3 shows a section of the pilot value shown in FIG. 2. That is, FIG. 3 depicts a sectional shape of the pilot valve 26 shown in FIG. 2, and further depicts the input/output ports of the pilot valve 26. In the pilot valve 26, a supply pressure port D and a second output pressure port B to which an upper part of the actuator is connected are connected, and a first output pressure port A connected to a lower part of the actuator is blocked by a spool. A pilot valve stem position is changed depending on a size of the driving force generated in the diaphragm part described above, and an opening of each output pressure port is adjusted. Accordingly, a pressure introduced to the upper and lower parts of the actuator is adjusted. The pressure supplied to the upper and lower parts of the actuator is input through the supply pressure port and different depending on a manufacturer, but a general range of the supply pressure is 25 to 150 psi. Lastly, when a position of the valve stem 15 of the output system 10 is changed, a feedback link structure 28 is a part that plays the role of a bridge for feedback of position information of the changed valve stem position to the positioner 23, and connected to the valve stem 15 of the output system 10. Additionally, a span adjustment screw and a zero adjustment screw which are connected to the feedback link structure 28 are used for initial installation and correction of the positioner 23.

Figure 4:
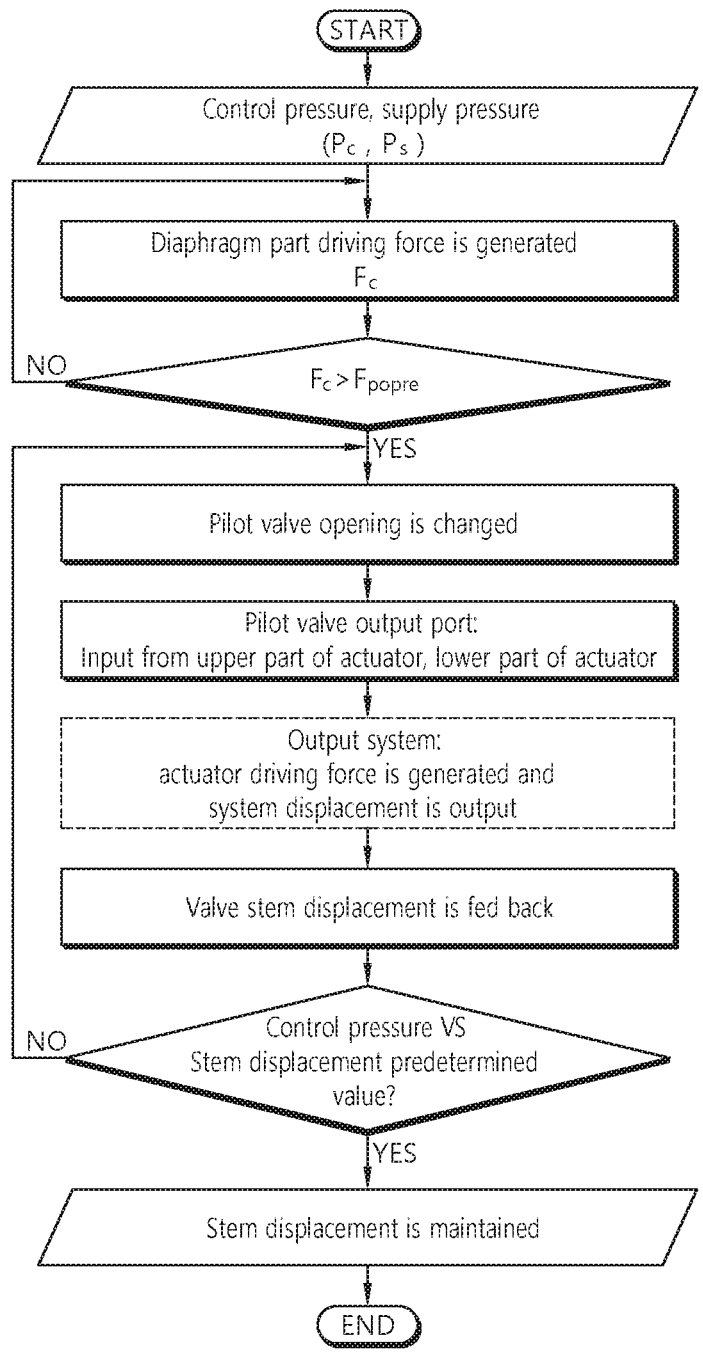
FIG. 4 is a flowchart illustrating an operation process of a pneumatic control valve.

FIG. 4 is a flowchart illustrating an operation process of a pneumatic control valve. That is, FIG. 4 depicts an operation principle of the positioner that corresponds to the input system shown in FIG. 2 and the actuator and the valve, that correspond to the output system. When a process is started, as described above, a control pressure $P_c$ and a supply pressure $P_s$ are input to the positioner, and the control pressure input to the diaphragm part is converted to a driving force $F_c$. When the converted driving force becomes greater than a spring preload $F_{popre}$ in the positioner, the components connected to the diaphragm part operate together and change an opening of the pilot valve.

Depending on the opening of the pilot valve, the pressure supplied from the pressure capillary is provided to upper and lower cylinders of the actuator in divided manner, and accordingly, a driving force is generated on the actuator of the output system. When a size of the generated driving force becomes greater than a load generated in the actuator or the valve like a packing frictional force, a frictional force due to a cylinder or an o-ring, or the like, the valve stem of the output system moves. When the stem of the valve moves, a stem position is fed back through a feedback link which is connected between the valve stem of the output system and the positioner, and it is determined whether to readjust the stem position by comparing the feedback stem position with a control pressure. In the case that an adjustment of the stem position is not required, a current stem position is maintained.

Figure 5A:
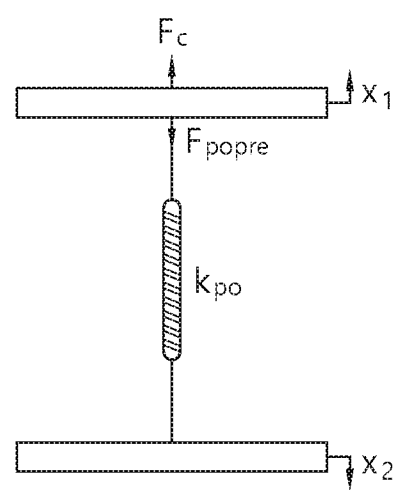
FIGS. 5A and 5B are a free body diagram for each component device of a pneumatic control valve.
Figure 5B:
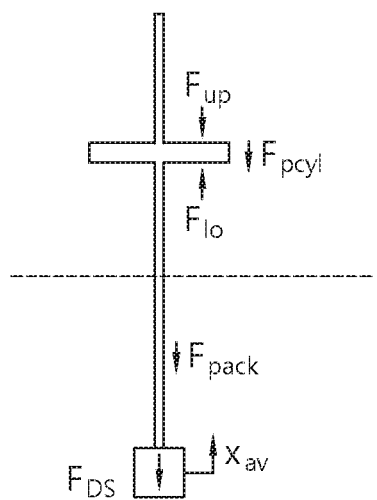

FIGS. 5A and 5B is a free body diagram for each component device of a pneumatic control valve. With reference to FIGS. 5A and 5B, a relational expression for the positioner, the actuator and the valve included in the input/output system of the pneumatic control valve will be described. Although several component devices are configured in complicated manner in an internal structure of the actual positioner, in FIGS. 5A and 5B, the internal structure is simplified within the range that does not influence behavior characteristics of the positioner. In FIG. 5A, x1 and x2 mean motions of the balance beam of the positioner and the stem displacement feedback link structure, respectively. The motion of the balance beam plays the role of changing an opening of the pilot valve of the positioner and controlling a pressure input to upper and lower parts of the actuator. In addition, the stem displacement feedback link structure is a part that feedbacks a stem displacement to the positioner when a displacement occurs in the valve stem. The free body diagram for the actuator and the valve is shown in FIG. 5B. The actuator and the valve are available to be separated into independent devices with each other, but actually, stem parts of the actuator and the valve may be connected with a connector, and based on the dotted line, the upper part may mean the actuator, and the lower part may mean the valve.

The force generated by a control pressure input to the positioner diaphragm part from FIGS. 5A and 5B may be represented as Equation 1 below, and Equation 2 is a force balance relational expression of the balance beam of the positioner and the internal spring feedback link structure. Equation 3 defines the force generated by a pressure applied to the upper and lower parts of the actuator exerted on the actuator piston as $F_{up}$ and $F_{lo}$, respectively. Force $F_a$ generated in the actuator equals to force difference generated in the upper and lower parts of the actuator. Equation 4 is a force balance relational expression exerted on the actuator and the valve, and $F_{a\_act}$ means the force that moves the actuator and the valve. In addition, the load $F_{DS}$ owing to weights of the stem and the plug or generated or the load generated in the valve such as a packing load $F_{pack}$ may be measured in the stem force sensor $F_{stem}$ of the valve stem. Furthermore, there is no spring in the actuator of a main water supply control valve, and in order to calculate a stem displacement as represented in Equation 5, a relational expression may be derived by assuming a bulk modulus of elasticity of air which is existed in the actuator cylinder.

$$P_C \cdot A_C = F_C \quad \text{[Equation 1]}$$

$$F_C F - F_{popre} = k(x_1 - x_2) \quad \text{[Equation 2]}$$

$$F_{up} - F_{lo} = F_a \quad \text{[Equation 3]}$$

$$F_a \pm F_{pcyl} \pm F_{DS} \pm F_{pack} = F_{a\_act} \quad \text{[Equation 4]}$$

$$F_{a\_act} \div k_{air} = x_S \quad \text{[Equation 5]}$$

Figure 6:
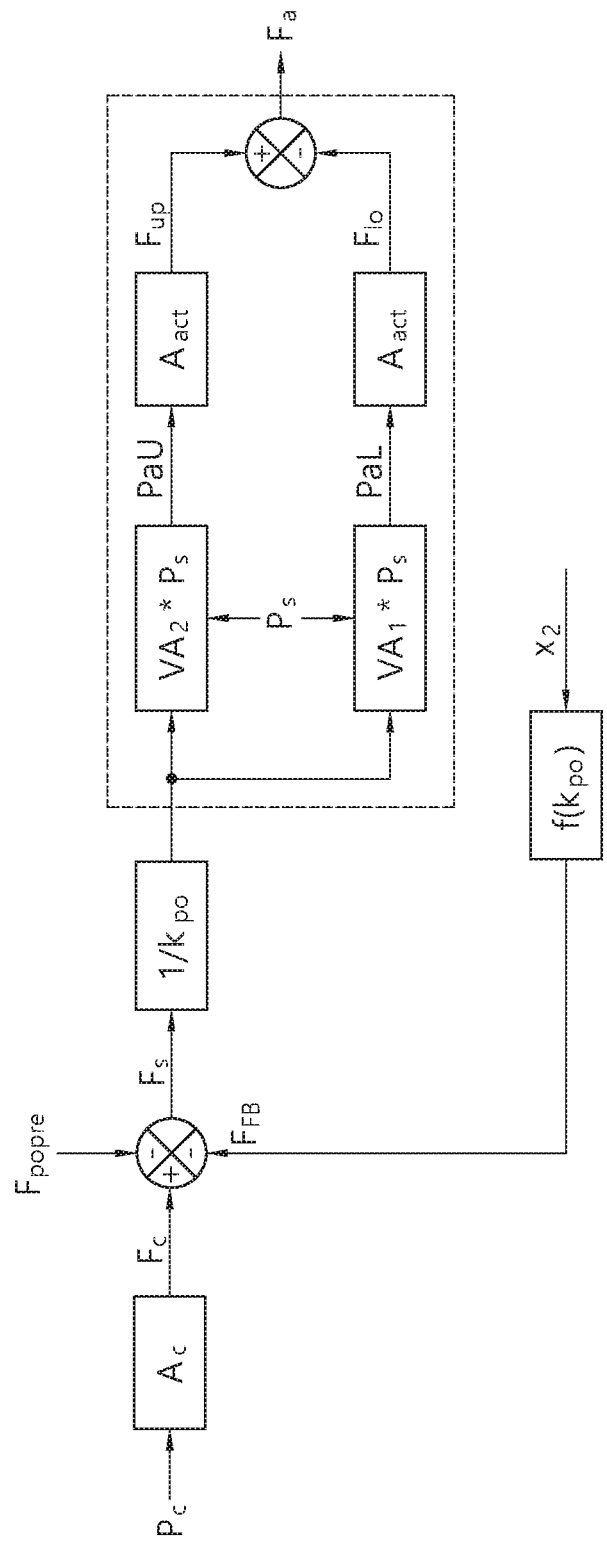
FIG. 6 is a block diagram for Equation 1 to Equation 3.

$P_C$: control pressure (I/P converter output pressure
$A_c$: diaphragm cross sectional area of positioner
$F_C$: force by control pressure
$F_{popre}$: internal spring preload of positioner
$k_{po}$: internal spring constant of positioner
$x_1$: displacement of balance beam, pilot valve stem
$x_2$: displacement of feedback link structure
$F_{up}$: force generated by upper part of positioner
$F_{lo}$: force generated by lower part of positioner
$F_S$: actual driving force of positioner
$F_a$: force difference between upper part and lower part of positioner
$F_{pcyl}$: frictional load
$F_{DS}$: load owing to weight of stem and plug
$F_{pack}$: packing load
$F_{a\_act}$: force moving actuator and valve
$k_{air}$: bulk modulus of elasticity of air (assumed value)
$x_s$: stem displacement FIG. 6 is a block diagram for Equation 1 to Equation 3. That is, FIG. 6 illustrates Equation 1 to Equation 3 that represent the relational expression for the control pressure and the diaphragm cross sectional area, the relational expression for the positioner actual driving force $F_S$ for calculating the pilot valve stem displacement $x_1$, and the like as a block diagram. In addition, $VA_1$ and $VA_2$ shown in the dotted line of FIG. 6 are variables in relation to the output pressure ports denoted by A and B in FIG. 3, and include physical meanings such as rate of flow information according to a displacement of the pilot valve stem or a cross sectional area. These variables mean the pressure amplification factor of air that passes through the output pressure port, and it may be assumed that the pressure of the actuator is changed linearly according to the pilot valve stem displacement. Furthermore, the forces generated by PaU and paL, which mean the upper pressure and the lower pressure of the actuator, exerted on the actuator piston cross sectional area $A_{act}$ are denoted by $F_{up}$ and $F_{lo}$, and the force difference $F_a$ is transformed into a block diagram as shown in FIG. 6. $F_{FB}$ represents a relation between the displacement transferred through the feedback link structure and the spring when the valve stem displacement (or the stem displacement of the valve) of the output system is generated.

Figure 7:
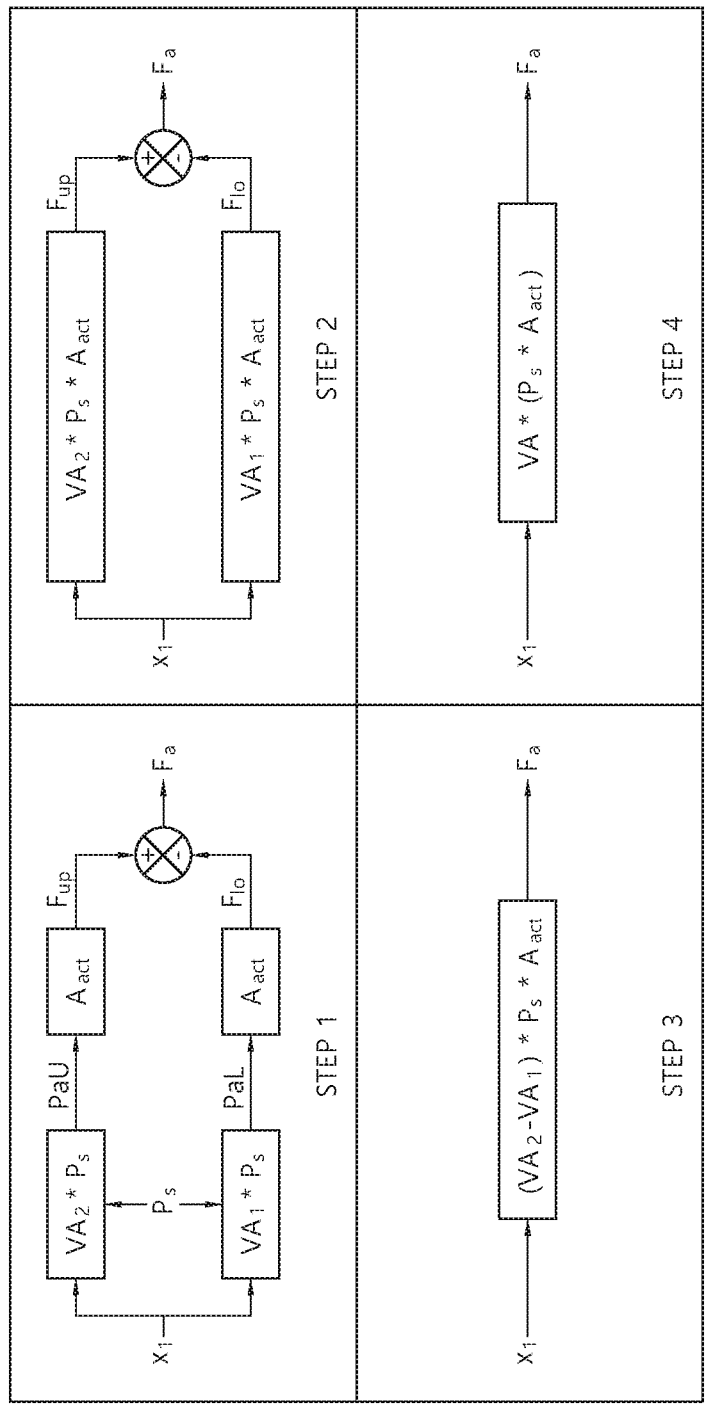
FIG. 7 illustrates a simplified drawing of the block diagram.

FIG. 7 illustrates a simplified drawing of the block diagram, and simplifies the block diagram denoted by the dotted line of FIG. 6 in total 4 STEPs. All of the 4 STEPs show block diagrams in which $x_1$ is input and $F_a$ is output. In the aspect of a system, all of STEP 1 to STEP 4 may be determined to be block diagrams including the same input and output. However, in the aspect of a model, variables are combined while the block diagrams are simplified, and the number of variables to know is changed. For example, the pressure amplification factor which has been represented by two variables such as $VA_1$ and $VA_2$ before the simplification may be integrated into VA in STEP 4 which is the last step of the simplification. In the case that the pressure amplification factor is a variable to be estimated, two variables should be estimated in STEP 1, but only one variable can be estimated in STEP 4.

Figure 8A:
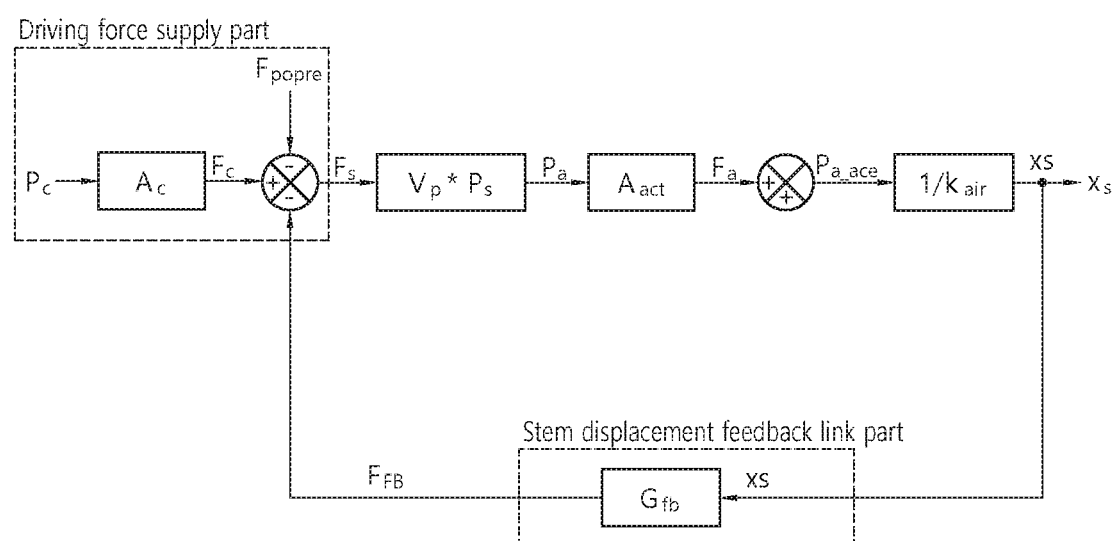
FIGS. 8A and 8B illustrate a control valve system model and a model parameter according to an example embodiment of the present invention.
Figure 8B:
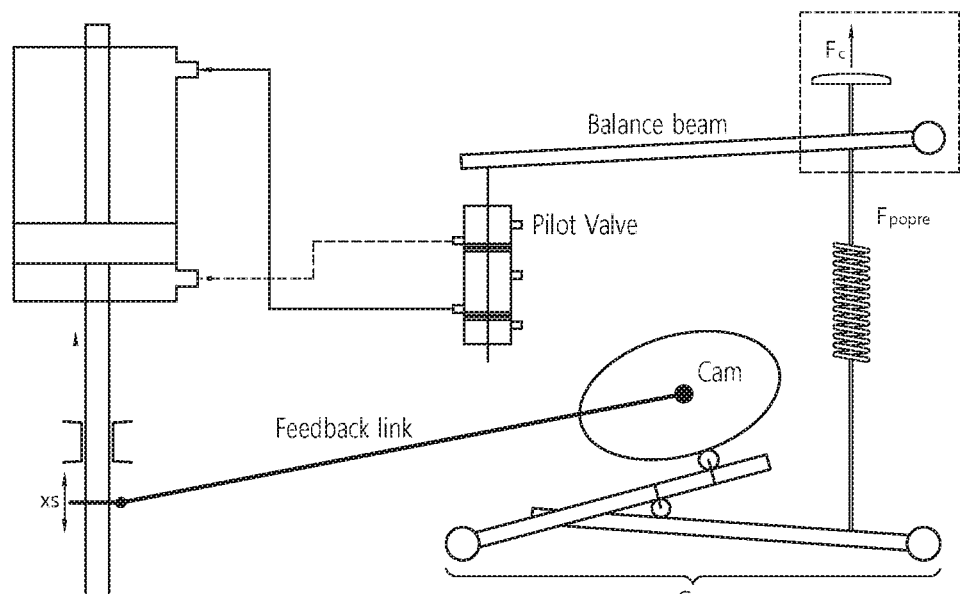

FIGS. 8A and 8B illustrates a control valve system model and a model parameter according to an example embodiment of the present invention. FIG. 8A depicts Equation 1 to Equation 5 derived above as a block diagram, and FIG. 8B shows a position of the model parameter. The block diagram of the control valve mode includes a model parameter, an internal parameter, and estimated internal parameters, and represented in Table 1 below. Here, the model parameter is a parameter that influences on an output result of the model depending on a change of the parameter value. As shown in FIGS. 8A and 8B, in this model, the internal spring preload $F_{popre}$ or the stem displacement feedback transmissibility $G_{fb}$ existed in the driving force supply part or the stem displacement feedback link part corresponds to the model parameter. In the internal parameter, information for the diaphragm cross sectional $A_c$ of the positioner or the cross sectional area $A_{act}$ of piston of the actuator is information which is already known by materials provided by the manufacturer or actual measurement or calculation, and input as a fixed value. Lastly, the estimated internal parameter is a parameter which is estimated at one time initially and fixed when the control valve system which is a subject of the model is changed, and does not influence on a model output result even though the value is changed. The pressure amplification factor of the pilot valve $V_p$ or the bulk modulus of elasticity of air of the actuator $k_{air}$ defined in this model corresponds to the estimated internal parameter.

TABLE 1

| Classification | Abbreviation | Description | Note |
|---|---|---|---|
| Model parameter | $F_{popre}$ | spring preload of positioner | Driving force supply part |
| | $G_{fb}$ | stem displacement transmissibility of positioner | Stem displacement feedback link part |
| Internal parameter | $A_c$ | diaphragm cross sectional area of positioner | Designed data |
| | $A_{act}$ | cross sectional area of piston of actuator | Designed data |
| Estimated internal parameter | $V_p$ | pressure amplification factor of pilot valve | Initial estimation is required |
| | $k_{air}$ | bulk modulus of elasticity of air of actuator | Initial estimation is required |

Figure 9:
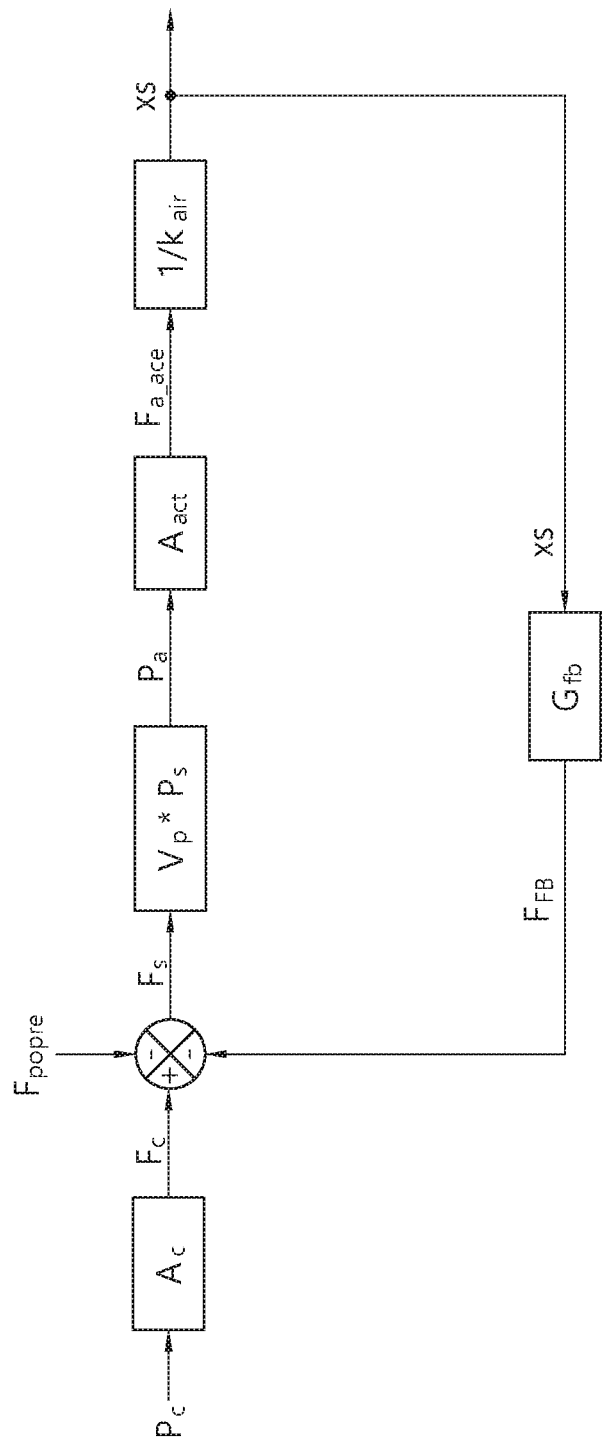
FIG. 9 is a block diagram in which a signal of the driving force supply part is input.
Figure 10:
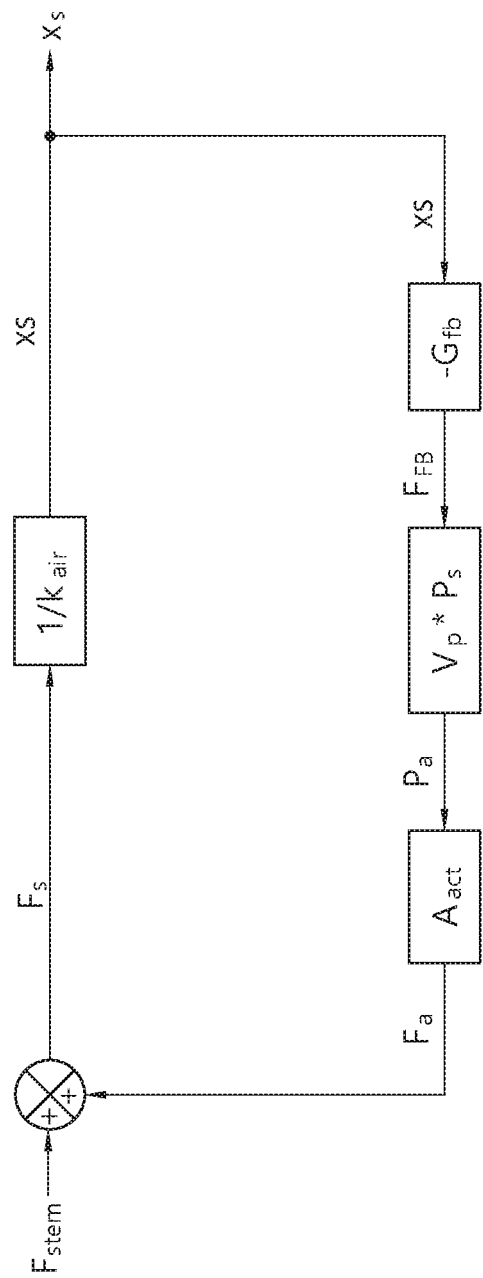
FIG. 10 is a block diagram in which a stem force signal is input.

With reference to the contents described above, the final model relational expression used in the example embodiment of the present invention is described. FIG. 9 and FIG. 10 reconstruct the control valve block diagram model shown in FIG. 8A by dividing into two block diagrams according to an input signal. FIG. 9 is a block diagram in which a valve stem displacement (or a stem displacement of the valve) is output in the state that a signal of the driving force supply part is input to the model and $F_{stem}$ (load generated in the actuator or the valve) part is 0, and FIG. 10 is a block diagram in which a valve stem displacement (or a stem displacement of the valve) is output in the state that Fstem signal is input to the model and the driving force supply part signal is 0.

The transfer functions for input and output of each block diagram are derived as represented in Equation 6 and Equation 7 below.

$$x_s = \frac{1}{1 + H_1 G_1} \times (\text{input1} \times H_1) \quad [\text{Equation 6}]$$

input1: Input signal, $P_c{}^*A_c - F_{popre}$
$H_1$ Forward Gain 1, $V_p{}^*P_s{}^*A_{act}{}^*(1/k)$
$G_1$: Backward Gain 1, $G_{fb}$ $$x_s = \frac{1}{1 - H_2 G_2} \times (\text{input2} \times H_2) \quad [\text{Equation 7}]$$

input2: input signal, $F_{stem}$
$H_2$: Forward Gain 2, $1/k_{air}$
$G_2$: Backward Gain 2, $A_{act}{}^*V_p{}^*P_d{}^* - G_{fb}$ $$x_s = \frac{1}{1 - H_1 G_1} * (\text{input1} * H_1) + \frac{1}{1 + H_2 G_2} * (\text{input2} * H_2) \quad [\text{Equation 8}]$$

Equation 8 is a linearly combined form of Equation 6 and Equation 7, and a relational expression by assuming the control valve system as a linear system, and input to a model parameter optimization function described below. Herein, $x_s$ may represent a stem displacement of the valve, $P_c$ may represent a control pressure, $A_c$ may represent a diaphragm cross sectional area of the positioner, $F_{popre}$ may represent an internal spring preload of the positioner, $V_p$ may represent a pressure amplification factor of a pilot valve of the positioner, $P_s$ may represent a supply pressure of a pilot valve of the positioner, $A_{act}$ may represent a cross sectional area of a piston of the actuator, $k_{air}$ may represent a bulk modulus of elasticity of air within a piston, $G_{fb}$ may represent a stem displacement transmissibility and $F_{stem}$ may represent a load generated in the actuator or the valve.

Figure 11:
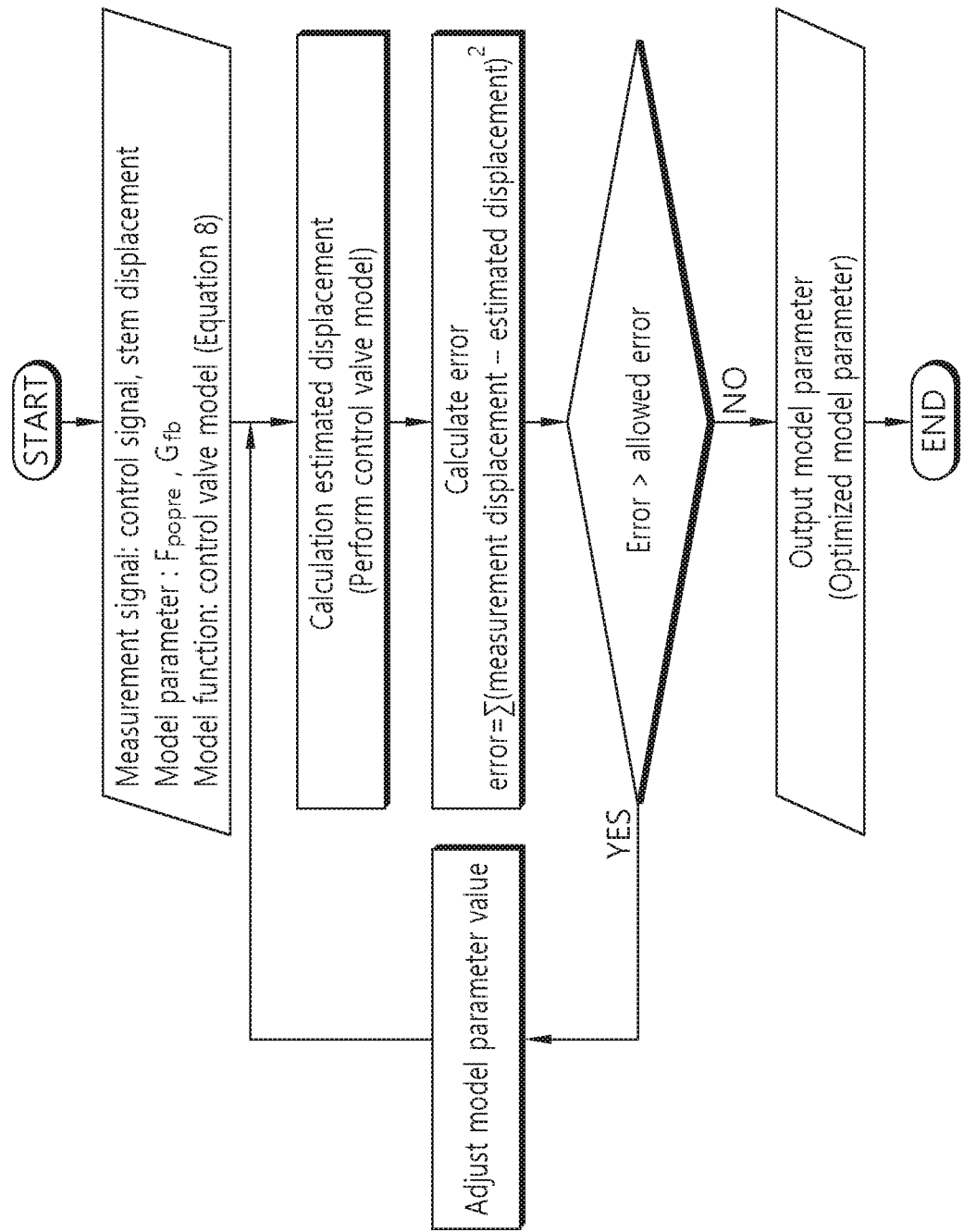
FIG. 11 illustrates a model parameter estimation process through an optimization function.

FIG. 11 illustrates a model parameter optimization function, and a model parameter may be estimated by using a method of inputting a function coding Equation 8 and a parameter initial assumption value into the optimization function and executing.

Figure 12A:
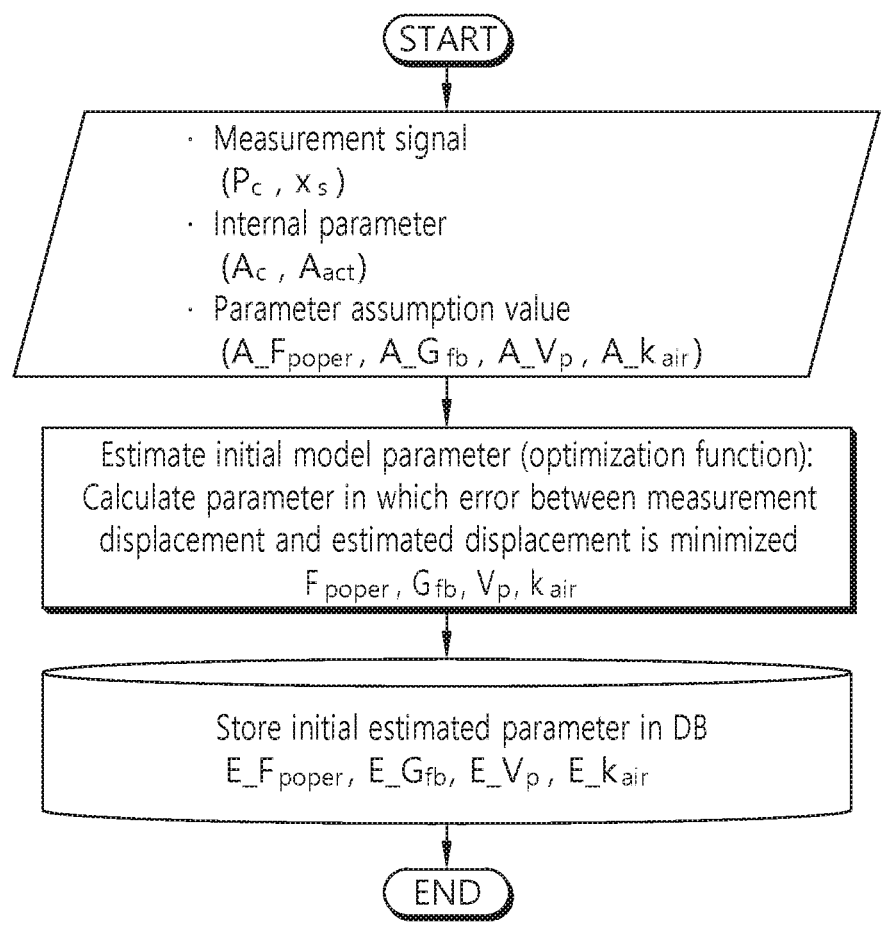
FIGS. 12A and 12B illustrates a developed model operation process.
Figure 12B:
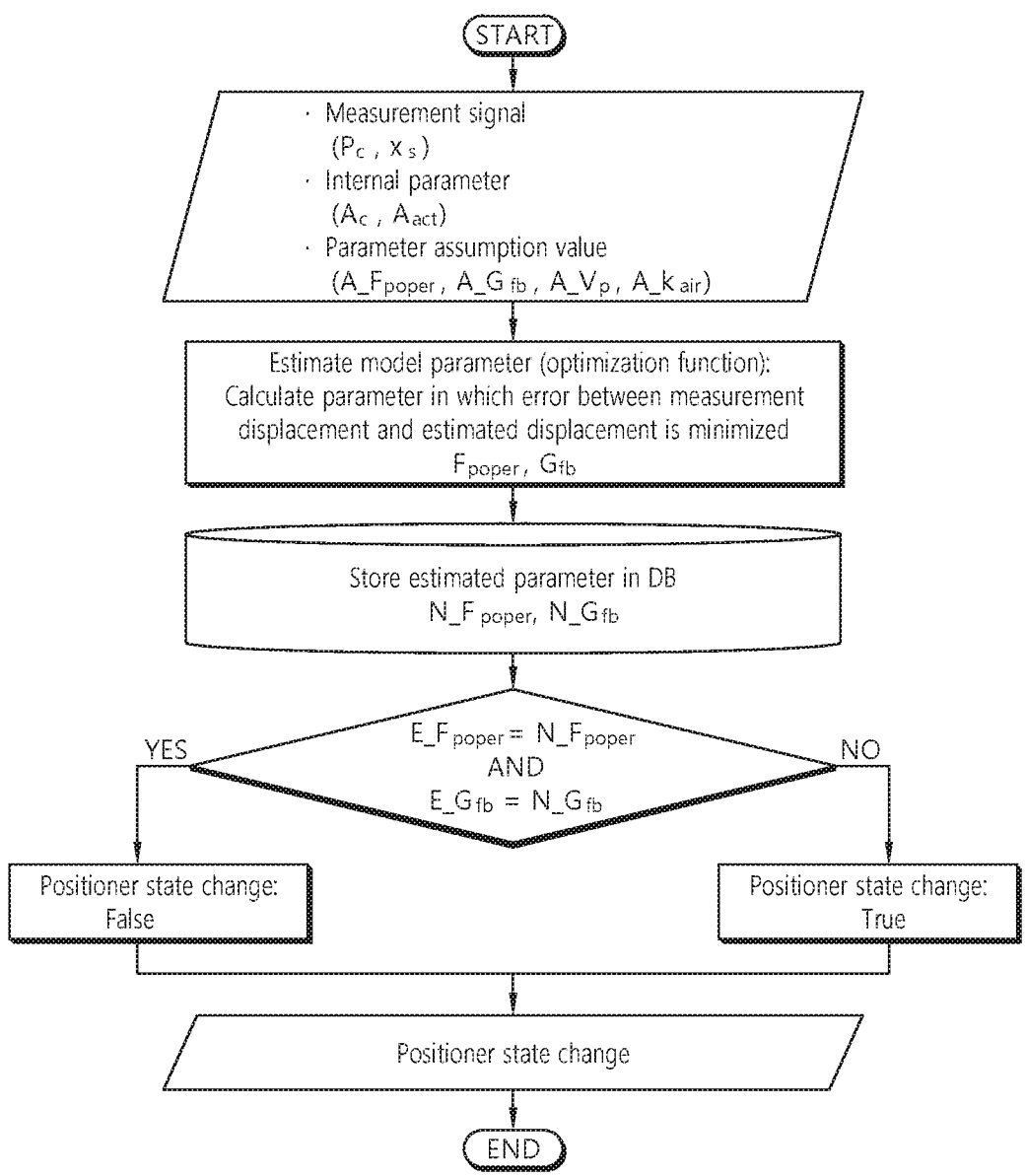

FIGS. 12A and 12B illustrate an operation process of the developed pneumatic control valve, the internal parameter and the estimated internal parameter may be changed and applied for a control valve of which structure and operation method are similar. FIG. 12A shows a process operating when the control valve model developed in the control valve system is initially applied, the process is progressed in the order that when the measurement signal and the model parameter assumption value and the internal parameter are input into the model and executed, the model parameter and the estimated internal parameters are output and stored. The model parameter estimated in the initial operation process is a reference value representing a current state of the control valve system. FIG. 12B shows the case that the control valve diagnostic model according to example embodiment of the present invention is persistently applied to the control valve system which is experienced to perform the initial operation process. The assumption value for estimating a model parameter may be provided arbitrarily like the initial operation process, but when the value estimated in the initial operation process is used, the model parameter estimation may become faster. When a model parameter is newly estimated by using a measurement signal, the model parameter may be used as an indicator for monitoring a state change of the control valve system through a comparison with previous estimated model parameters which are stored in database.

Figure 13:
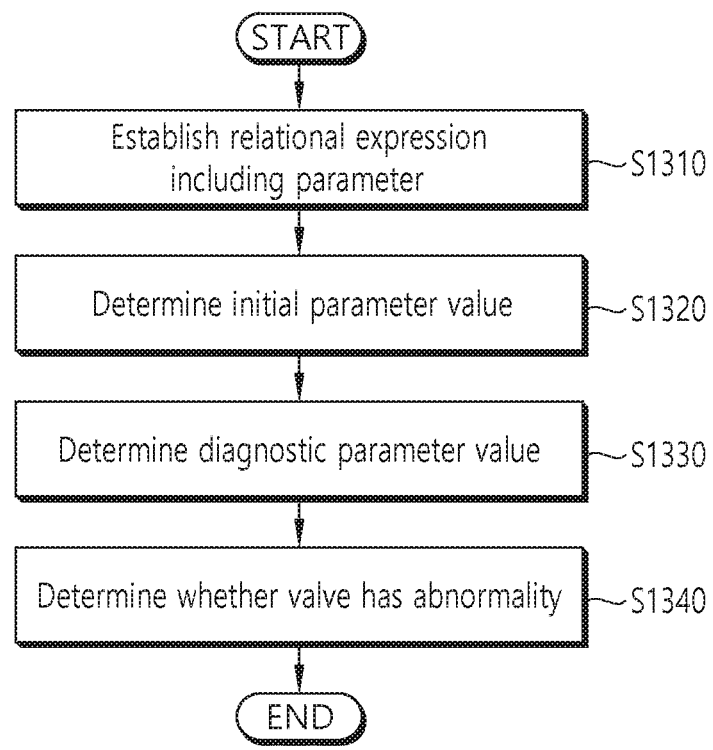
FIG. 13 is a flowchart of a method for diagnosing a pneumatic control valve by using a positioner model according to an example embodiment of the present invention.

FIG. 13 is a flowchart of a method for diagnosing a pneumatic control valve by using a positioner model according to an example embodiment of the present invention. Hereinafter, with reference to FIG. 2 and FIG. 13, the method for diagnosing a pneumatic control valve by using a positioner model according to an example embodiment of the present invention is described in more detail. As shown in FIG. 2, the method for diagnosing a pneumatic control valve by using a positioner model according to an example embodiment of the present invention may diagnose a state of the controller for outputting a control pressure, a positioner 23 for receiving the control pressure as an input signal and adjusting a pressure supplied to the actuator 11 and the pneumatic control valve 1 including the actuator 11 and the valve 13 for driving the valve 13 based on the supplied pressure.

Referring to FIG. 13, firstly, the method for diagnosing a pneumatic control valve by using a positioner model according to an example embodiment of the present invention may include parameter for the properties of the positioner 23, the actuator 11 and the valve 13 and establish a relational expression for outputting a displacement of the stem 15 of the valve according to the control pressure $P_c$ (step, S1310). Here, the parameters may include a model parameter, an internal parameter and an estimated internal parameter, and as described above, the output value obtained by the relational expression may change according to a change of the model parameter value. The internal parameter may be a fixed value according to a specification of the pneumatic control valve 1, and the estimated internal parameter may have a fixed value by estimating initially for the pneumatic control valve by one time when the pneumatic control valve 1 which is diagnosed is changed.

Meanwhile, as described above, the model parameter may include a preload $F_{popre}$ of a spring 27 included in the positioner 23 and a stem displacement transmissibility $G_{fb}$ of a stem displacement feedback connection part 28 included in the positioner 23, for example. In addition, the internal parameter may include a cross sectional area $A_c$ of a diaphragm 24 included in the positioner 23 and a cross sectional area $A_{act}$ of a piston included in the actuator 11. Furthermore, the estimated internal parameter may include a pressure amplification factor $V_p$ of a pilot valve 26 included in the positioner 23 and a bulk modulus of elasticity of air $k_{air}$ within a piston included in the actuator 11.

Referring to FIG. 13 again, at the time when it is identified that the pneumatic control valve 1 is in a normal state, an initial parameter value may be determined by adjusting the values of the parameters until a difference between a measurement value (e.g., stem displacement according to predetermined control pressure) for a normal operation of the pneumatic control valve 1 and an output value (e.g., stem displacement according to the same control pressure) obtained by the relational expression is smaller than a predetermined error limit (step, S1320). More particularly, based on a predetermined internal parameter value, the initial model parameter and the initial estimated internal parameter may be determined.

Later, at the time when a diagnosis of the pneumatic control valve 1 is required, a diagnostic parameter value may be determined by adjusting the values of the parameters until the difference between a measured value for a diagnostic operation of the pneumatic control valve 1 and an output value obtained by the relational expression is smaller than a predetermined error limit (step, S1330). More particularly, based on a predetermined internal parameter value and the initial estimated internal parameter, a diagnostic model parameter may be determined.

Next, it may be determined whether the pneumatic control valve 1 has an abnormality by comparing the initial parameter value and the diagnostic parameter value (step, S1340). Particularly, by comparing the initial model parameter and the diagnostic model parameter, it may be determined whether the pneumatic control valve 1 has an abnormality. When a difference between the initial model parameter and the diagnostic model parameter is within a predetermined error limit, it may be represented that the pneumatic control valve 1 is in a normal state, and a degree of abnormality may be determined step by step by determining a plurality of level values.

Figure 14:
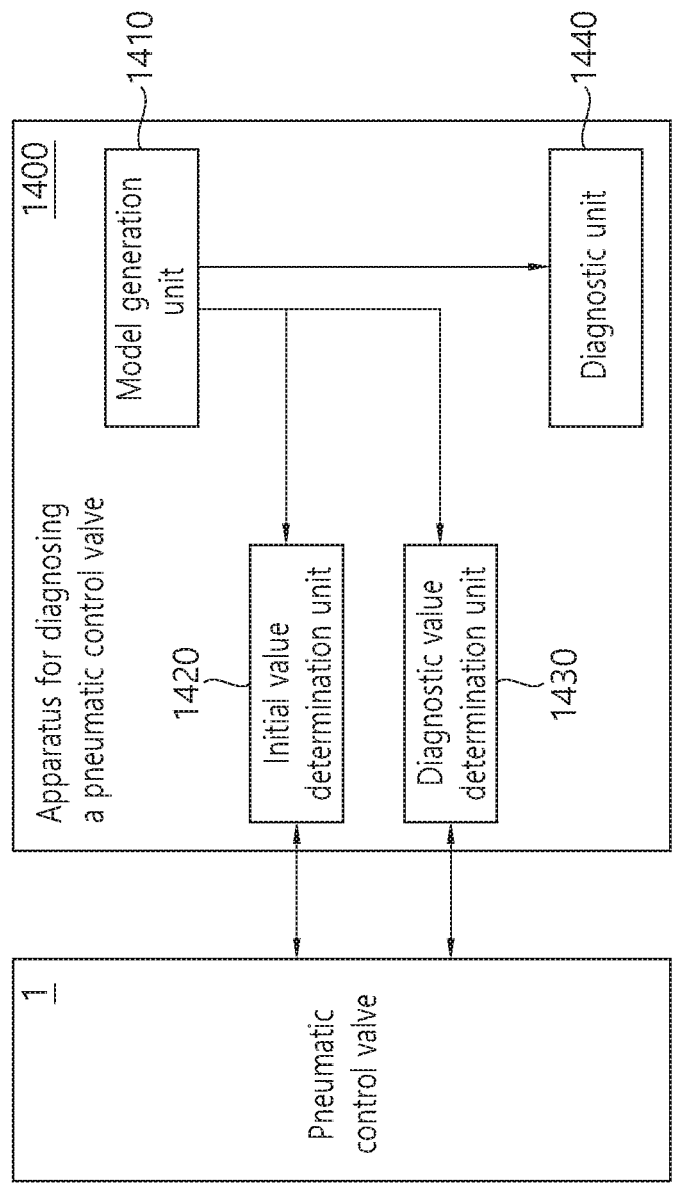
FIG. 14 is a block diagram illustrating a configuration of an apparatus for diagnosing a pneumatic control valve by using a positioner model according to an example embodiment of the present invention.

FIG. 14 is a block diagram illustrating a configuration of an apparatus for diagnosing a pneumatic control valve by using a positioner model according to an example embodiment of the present invention. As shown in FIG. 14, the apparatus 1400 for diagnosing a pneumatic control valve by using a positioner model according to an example embodiment of the present invention may include a model generation unit 1410, an initial value determination unit 1420, a diagnostic value determination unit 1430 and a diagnostic unit 1440.

The model generation unit 1410 may include parameters for properties of the positioner 23, the actuator 11 and the valve 13, and establish a relational expression for outputting a valve stem displacement (or a stem displacement of the valve) according to the control pressure. The initial value determination unit 1420 may determine an initial parameter value by adjusting the values of the parameters until a difference between a measurement value for a normal operation of the pneumatic control valve 1 and an output value obtained by the relational expression is smaller than a predetermined error limit. In addition, the diagnostic value determination unit 1430 may determine a diagnostic parameter value by adjusting the values of the parameters until the difference between a measured value for a diagnostic operation of the pneumatic control valve 1 and an output value obtained by the relational expression is smaller than a predetermined error limit. Furthermore, the diagnostic unit 1440 may determine whether the pneumatic control valve has an abnormality by comparing the initial parameter value and the diagnostic parameter value.

The detailed operation of the apparatus for diagnosing a pneumatic control valve by using a positioner model according to an example embodiment of the present invention may be changed according to the method for diagnosing a pneumatic control valve by using a positioner model described above.

The method for diagnosing a pneumatic control valve by using a positioner model according to example embodiment of the present invention may be implemented in a medium readable by a computer as codes readable by a computer. The medium readable by a computer includes all types of record media in which data readable by a computer system is stored. For example, the medium may include ROM (Read Only Memory), RAM (Random Access Memory), magnetic tape, magnetic disk, flash memory, optical data storage device, and the like. In addition, the medium readable by a computer may be distributed to a computer system connected to a computer network, and stored as codes readable in distributed manner and executed.

Figure 15A:
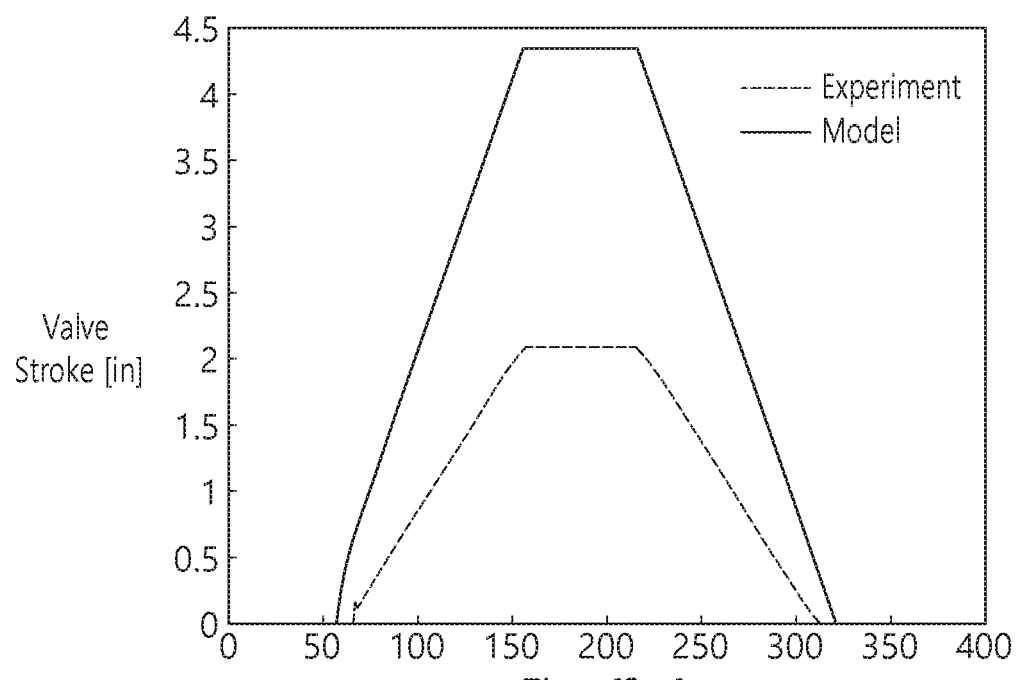
FIGS. 15A and 15B shows a comparison between an experiment result and a result of the model prediction.
Figure 15B:
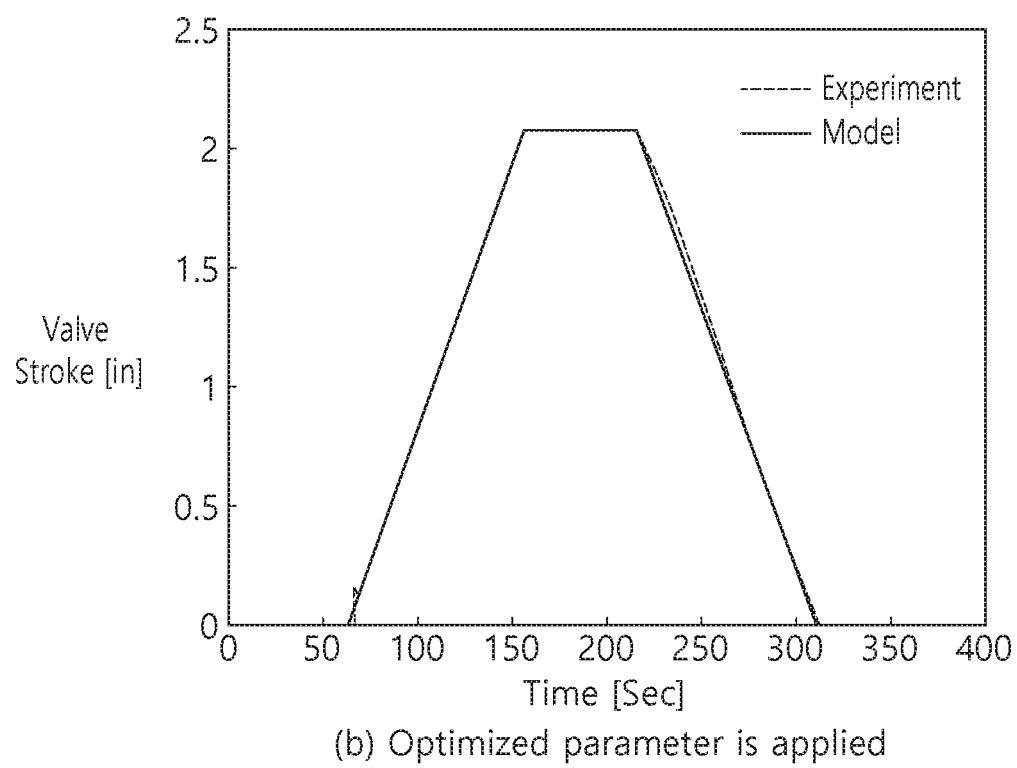

FIG. 15 shows a comparison between an output result by inputting an initial assumption model parameter to a model and an output result by inputting an optimized parameter through the developed program to a model with experiment data. Referring to FIGS. 15 (a) and (b), the developed model represents an operation of the control valve system accurately, and it can be known that accuracy of prediction can be improved through the model parameter optimization.

So far, the present invention is described with reference to drawings and embodiments. However, it is understood that the scope of the present invention is not limited to the drawings and the embodiments, and those skilled in the art may modify and change the present invention in various ways within the scope not departing from the concept and the scope of the present invention written in the following claims.

The invention claimed is:

1. A method comprising diagnosing a pneumatic control valve by using a positioner model,
   the pneumatic control valve including a controller for outputting a control pressure, a positioner for receiving the control pressure as an input and controlling a pressure supplied to an actuator, the actuator for driving a valve based on the supplied pressure and the valve, wherein diagnosing the pneumatic control valve comprises:
   establishing a relational expression for outputting a valve stem displacement according to the control pressure, the relational expression including parameters for properties of the positioner, the actuator and the valve;
   determining an initial parameter value by adjusting values of the parameters until a difference between a measurement value for a normal operation of the pneumatic control valve and an output value obtained by the relational expression is smaller than a predetermined error limit;
   determining a diagnostic parameter value by adjusting the values of the parameters until the difference between a measured value for a diagnostic operation of the pneumatic control valve and an output value obtained by the relational expression is smaller than a predetermined error limit; and
   determining whether the pneumatic control valve has an abnormality by comparing the initial parameter value and the diagnostic parameter value, the positioner model comprising the relational expression and wherein the relational expression is an expression for outputting the valve stem displacement according to the control pressure, the relational expression including parameters for the properties of the positioner, the actuator, and the valve.

2. The method of claim 1, wherein the parameters include a model parameter, an internal parameter and an estimated internal parameter, wherein the output value obtained by the relational expression changes according to a change of the model parameter value, wherein the internal parameter is a fixed value according to a specification of the pneumatic control valve, and wherein the estimated internal parameter is a fixed value obtained by estimating initially for the pneumatic control valve by one time.

3. The method of claim 2, wherein the step of determining an initial parameter value determines the initial parameter value and an initial estimated internal parameter based on a predetermined internal parameter value, wherein the step of determining a diagnostic parameter value determines the diagnostic parameter value based on the predetermined internal parameter value and the initial estimated internal parameter value, and wherein the step of determining whether the pneumatic control valve has an abnormality determines whether the pneumatic control valve has an abnormality by comparing the initial model parameter and the diagnostic model parameter.

4. The method of claim 2, wherein the model parameter includes a preload of a spring included in the positioner and a stem displacement transmissibility of a stem displacement feedback connection part included in the positioner.

5. The method of claim 2, wherein the internal parameter includes a cross sectional area of a diaphragm included in the positioner and a cross sectional area of a piston included in the actuator.

6. The method of claim 2, wherein the estimated internal parameter includes a pressure amplification factor of a pilot valve included in the positioner and a bulk modulus of elasticity of air within a piston included in the actuator.

7. The method of claim 1, wherein the relational expression has a following transfer function:

$$x_s = \frac{1}{1 - H_1 G_1} * (\text{input1} * H_1) + \frac{1}{1 + H_2 G_2} * (\text{input2} * H_2)$$

input1: Input signal, $P_c * A_c - F_{popre}$
$H_1$: Forward Gain 1, $V_p * P_s * A_{act} * (1/k_{air})$
$G_1$: Backward Gain 1, $G_{fb}$
input2: input signal, $F_{stem}$
$H_2$: Forward Gain 2, $1/k_{air}$
$G_2$: Backward Gain 2, $A_{act} * V_p * P_s * -G_{fb}$
wherein, $x_s$ represents a stem displacement of the valve, $P_c$ represents a control pressure, $A_c$ represents a diaphragm cross sectional area of the positioner, $F_{popre}$ represents an internal spring preload of the positioner, $V_p$ represents a pressure amplification factor of a pilot valve of the positioner, $P_s$ represents a supply pressure of a pilot valve of the positioner, $A_{act}$ represents a cross sectional area of a piston of the actuator, $k_{air}$ represents a bulk modulus of elasticity of air within a piston, $G_{fb}$ represents a stem displacement transmissibility and $F_{stem}$ represents a load generated in the actuator or the valve.

8. An apparatus for diagnosing a pneumatic control valve by using a positioner model, the pneumatic control valve including a controller for outputting a control pressure, a positioner for receiving the control pressure as an input and controlling a pressure supplied to an actuator, the actuator being for driving a valve based on the supplied pressure and the valve, the further comprising: a model generation unit for establishing a relational expression for outputting a valve stem displacement according to the control pressure, the relational expression including parameters for properties of the positioner, the actuator and the valve; an initial value determination unit for determining an initial parameter value by adjusting the values of the parameters until a difference between a measurement value for a normal operation of the pneumatic control valve and an output value obtained by the relational expression is smaller than a predetermined error limit; a diagnostic value determination unit for determining a diagnostic parameter value by adjusting the values of the parameters until the difference between a measured value for a diagnostic operation of the pneumatic control valve and an output value obtained by the relational expression is smaller than a predetermined error limit; and a diagnostic unit for determining whether the pneumatic control valve has an abnormality based on a comparison between the initial parameter value and the diagnostic parameter value, the positioner model comprising the relational expression and wherein the relational expression is an expression for outputting the valve stem displacement according to the control pressure, the relational expression including parameters for the properties of the positioner, the actuator, and the valve.

9. The apparatus of claim 8, wherein the parameters include a model parameter, an internal parameter and an estimated internal parameter, wherein the output value obtained by the relational expression changes according to a change of the model parameter value, wherein the internal parameter is a fixed value according to a specification of the pneumatic control valve, and wherein the estimated internal parameter is a fixed value by estimating initially for the pneumatic control valve by one time.

10. The apparatus of claim 9, wherein the initial value determination unit determines the initial parameter value and an initial estimated internal parameter based on a predetermined internal parameter value, wherein the diagnostic value determination unit determines the diagnostic parameter value based on the predetermined internal parameter value and the initial estimated internal parameter value, and wherein the diagnostic unit determines whether the pneumatic control valve has an abnormality by comparing the initial model parameter and the diagnostic model parameter.

11. The apparatus of claim 8, wherein the relational expression has a following transfer function:

$$x_s = \frac{1}{1 - H_1 G_1} * (\text{input1} * H_1) + \frac{1}{1 + H_2 G_2} * (\text{input2} * H_2)$$

input1: Input signal, $P_c * A_c - F_{popre}$
$H_1$: Forward Gain 1, $V_p * P_s * A_{act} * (1/k_{air})$
$G_1$: Backward Gain 1, $G_{fb}$
input2: input signal, $F_{stem}$
$H_2$: Forward Gain 2, $1/k_{air}$
$G_2$: Backward Gain 2, $A_{act} * V_p * P_s * -G_{fb}$
wherein, $x_s$ represents a stem displacement of the valve, $P_c$ represents a control pressure, $A_c$ represents a diaphragm cross sectional area of the positioner, $F_{popre}$ represents an internal spring preload of the positioner, $V_p$ represents a pressure amplification factor of a pilot valve of the positioner, $P_s$ represents a supply pressure of a pilot valve of the positioner, $A_{act}$ represents a cross sectional area of a piston of the actuator, $k_{air}$ represents a bulk modulus of elasticity of air within a piston, $G_{fb}$ represents a stem displacement transmissibility and $F_{stem}$ represents a load generated in the actuator or the valve.

12. A storage medium readable by a computer for diagnosing a pneumatic control valve by using a positioner model, wherein the control valve includes a controller for outputting a control pressure, a positioner for receiving the control pressure as an input and controlling a pressure supplied to an actuator, the actuator for driving a valve based on the supplied pressure and the valve, the computer comprising a processor to perform: a command for establishing a relational expression for outputting a valve stem displacement according to the control pressure, the relational expression including parameters for properties of the positioner, the actuator and the valve; a command for determining an initial parameter value by adjusting the values of the parameters until a difference between a measurement value for a normal operation of the pneumatic control valve and an output value obtained by the relational expression is smaller than a predetermined error limit; a command for determining a diagnostic parameter value by adjusting the values of the parameters until the difference between a measured value for a diagnostic operation of the pneumatic control valve and an output value obtained by the relational expression is smaller than a predetermined error limit; and a command for determining whether the pneumatic control valve has an abnormality by comparing the initial parameter value and the diagnostic parameter value, the positioner model comprising the relational expression, the relational expression outputting the valve stem displacement according to the control pressure, the relational expression including parameters for the properties of the positioner, the actuator, and the valve.

13. The method of claim 1, wherein diagnosing a pneumatic control valve by using a positioner model is carried out non-abstractly.

14. A method comprising diagnosing a pneumatic control valve,
the pneumatic control valve including a controller for outputting a control pressure, an actuator, a valve stem having a valve, a positioner for receiving the control pressure as an input from the controller and using said control pressure to provide a supplied pressure to said actuator, thereby enabling said actuator to displace said valve stem based on said supplied pressure,
wherein, in response to said control pressure, said valve stem undergoes a displacement that depends on mechanical properties of said positioner, said actuator, and said valve,
said mechanical properties being characterized by parameters,
wherein diagnosing said pneumatic control valve comprises
obtaining a measurement value for normal operation of said pneumatic control valve,
adjusting values of the parameters for the properties of the positioner, the actuator, and the valve until a difference between said measurement value and a stem displacement that results from said values of said parameters is smaller than a predetermined error limit, thereby obtaining an initial-parameter value,
adjusting the values of the parameters for the properties of the positioner, the actuator, and the valve until the difference between a measured value for a diagnostic operation of the pneumatic control valve and an output value obtained by the relational expression is smaller than a predetermined error limit, thereby determining a diagnostic parameter value, and
comparing the initial parameter value and the diagnostic parameter value, and
based on said comparison, determining that said pneumatic control valve has an abnormality.

* * * * *